United States Patent [19]

Yen et al.

[11] 4,040,886

[45] Aug. 9, 1977

[54] APPARATUS FOR TREATING A WORKPIECE

[75] Inventors: Edward Chen-Hsiung Yen; Thomas Arthur Jenssen, both of Rochester, N.Y.

[73] Assignee: Eastman Kodak Company, Rochester, N.Y.

[21] Appl. No.: 681,948

[22] Filed: Apr. 30, 1976

[51] Int. Cl.² .................. B29C 27/08; B23K 1/06; B30B 1/00

[52] U.S. Cl. .................. 156/350; 156/580.1; 100/265; 228/1 R; 72/443

[58] Field of Search .................. 156/580.1, 580.2, 580, 156/350; 100/265; 228/1; 72/438, 443; 51/59 SS

[56] References Cited

U.S. PATENT DOCUMENTS

| | | | |
|---|---|---|---|
| 2,861,486 | 11/1958 | Brauer | 72/443 |
| 3,384,284 | 5/1968 | Obeda | 228/1 |
| 3,654,041 | 4/1972 | Wysong | 228/1 |

*Primary Examiner*—Douglas J. Drummond

*Attorney, Agent, or Firm*—J. A. Matthews

[57] ABSTRACT

Apparatus comprises a tool member (U) such as a sonic transducer, a fixture (F) for a workpiece, an anvil member (A), one of the members being stationary and the other being movable toward and away from the stationary member, a carriage (31) for the movable member, first means such as a piston rod (49) for holding the carriage up in ready position, second means such as a valve (VI) for releasing the first means to cause the carriage to descend to the workpiece, and third means such as a piston rod 51 for retarding descent to a velocity less than the free fall gravitational velocity. An automatic control system comprises sensing means, control relays and timing relays for activating the movable member, for energizing the tool member, for timing the period of energization, and for assuring dwell of the movable member in contact with the workpiece after the tool is deenergized. The control system also includes safety features for resetting the apparatus if there is no workpiece present, or if the energized tool does not act properly on the workpiece as by starting to melt it.

8 Claims, 6 Drawing Figures

APPARATUS FOR TREATING A WORKPIECE

BACKGOUND OF THE INVENTION

1. Field of the Invention

The present invention relates to a novel apparatus for effecting relative movement between an anvil and a tool such as a sonic or acoustic transducer for treating an article of manufacture, as by welding parts together, sinking one part into another, riveting or peening over a plastic member, or boring a hole.

2. The Prior Art

Plastic parts such as film cassettes have been bonded together ultrasonically as described in U.S. Pat. No. 3,224,916. Sonic techniques have also been used for the riveting of plastic parts as in U.S. Pat. No. 3,367,809, and for sinking metal parts into plastic as in U.S. Pat. No. 3,184,353. Such operations require that a sonic transducer having a horn be moved in one direction into contact with a workpiece where the sonic vibrations cause softening or melting to accomplish the desired result. Preferably, the sonic energy is in the ultrasonic frequency range of about 20KHz and higher, although vibrational energy of less than ultrasonic frequency is also functional. Then the transducer is moved in the opposite direction away from contact with the workpiece.

Movement of the transducer has been accomplished by a piston and cylinder mechanism in which the piston drives the transducer directly into and out of contact with the work-piece. Such a mechanism has certain disadvantages such as undesirably high impact against the workpiece, cylinder control problems related to acceleration and deceleration, loading of the transducer horn against the workpiece being dependent on cylinder pressure, follow-through of the horn after initial contact with the workpiece being dependent on piston follow-through, and the possibility of triggering sonic power when the horn is unloaded, resulting in potential damage to the horn. These disadvantages are most evident with systems using air as the fluid medium for actuating the piston; high cycle speeds; large horns using long strokes; and high sonic power.

SUMMARY OF THE INVENTION

In accordance with the present invention, we have provided a novel apparatus for effecting relative linear movement between a tool, such as a sonic transducer member, and an anvil member aligned therewith, so as to act on a workpiece which is positioned between the two members. One of the members normally is held stationary while the other moves toward and away from it. In the preferred embodiment the transducer member is held stationary while the anvil member moves back and forth. For simplicity, the invention will be described with reference to an ultrasonic transducer, but the principles also can be applied when the transducer operates at less than ultrasonic frequency.

A fixture is located near the stationary member for holding a workpiece which is to be treated when the movable member comes into contact with it.

In the preferred embodiment the movable member is located in a ready position vertically above the stationary member and moves downwardly toward the stationary member solely under the influence of gravity while being retarded to a velocity less than the free fall gravitational velocity so as to avoid detrimental impact against the workpiece, as well as to overcome the other disadvantages of the prior art. Force exerted on the workpiece is due only to the weight of the member and its carriage.

Movement in the opposite direction, away from the stationary member to its original ready position is effected by a fluid-actuated cylinder and piston mechanism.

The apparatus can be actuated manually by an operator, but advantageously an automatic electrical control system is brought into action by an operator when a workpiece has been placed in the fixture, causing the movable member to contact the workpiece. Then the operator actuates a switch, the transducer is energized, and the entire operation is completed without further activity by the operator.

THE DRAWINGS

THE PREFERRED EMBODIMENT

Referring to FIGS. 1 to 5, our novel apparatus comprises a vertical support S on a horizontal base B, having a fixture F for a workpiece projecting horizontally at an intermediate position.

Figure 1:
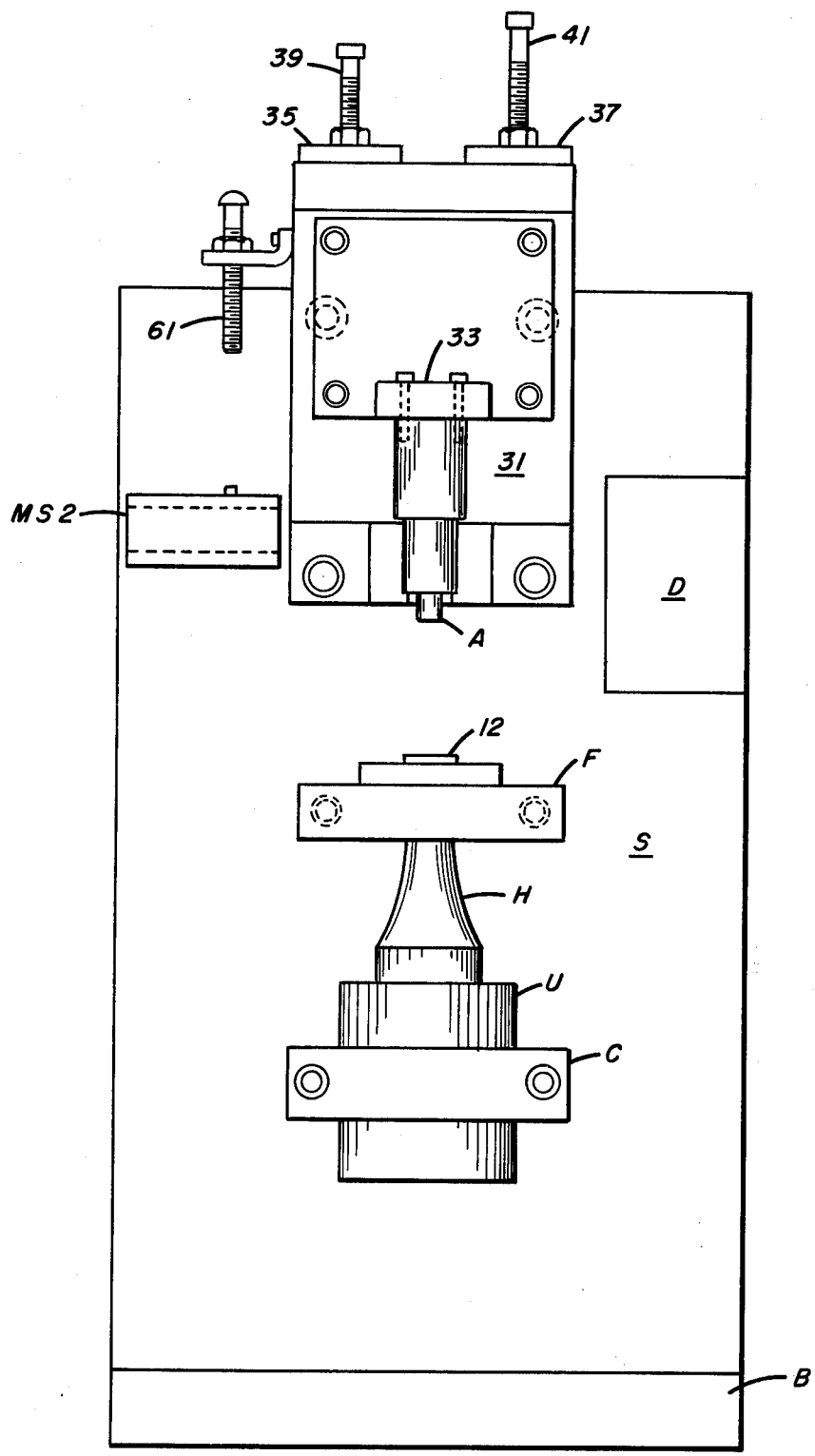
FIG. 1 is a front elevational view of an ultrasonic apparatus for riveting or otherwise acting on a workpiece.
Figure 2:
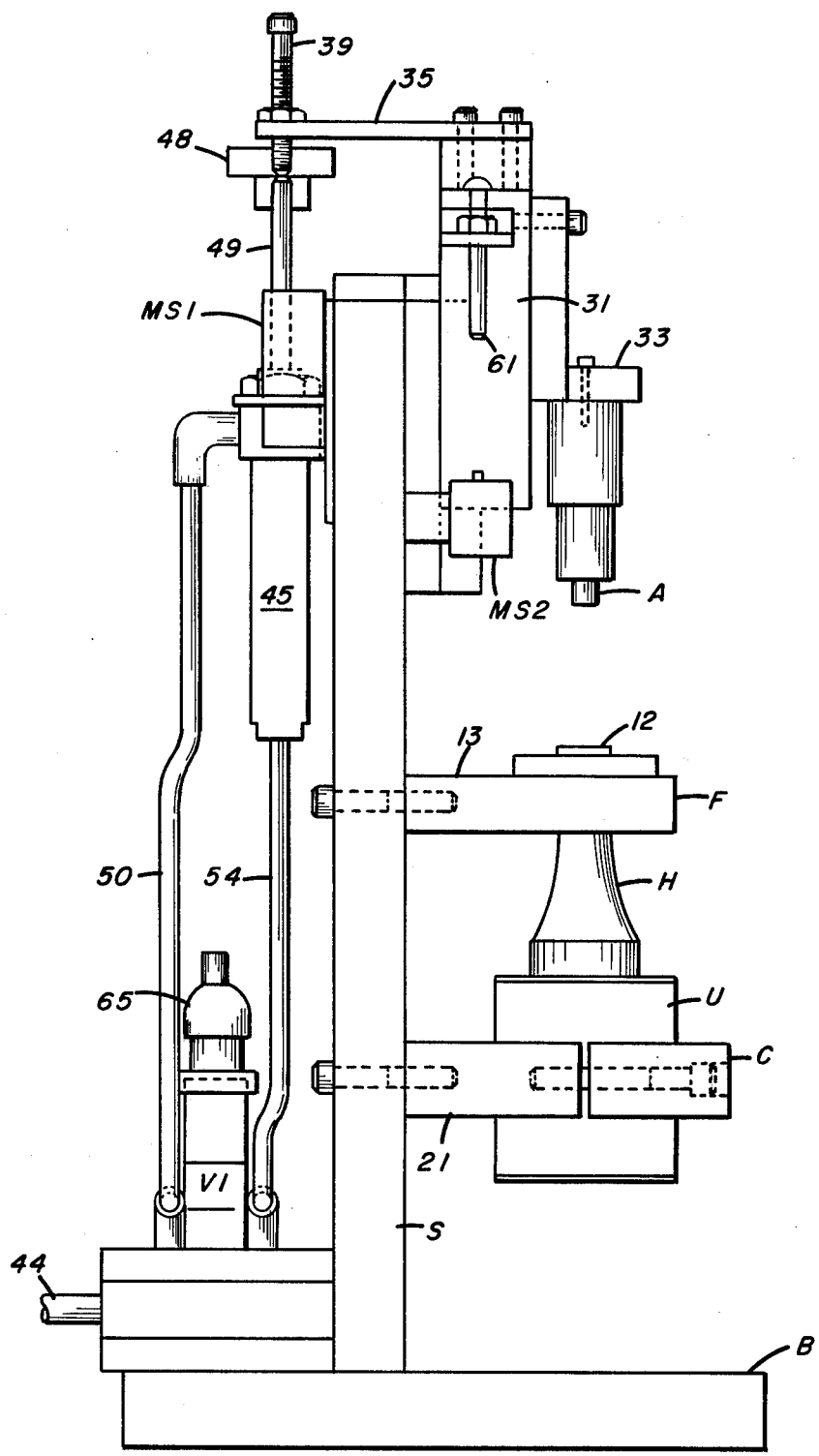
FIG. 2 is a side elevational view of the apparatus as seen from the left in FIG. 1.
Figure 3:
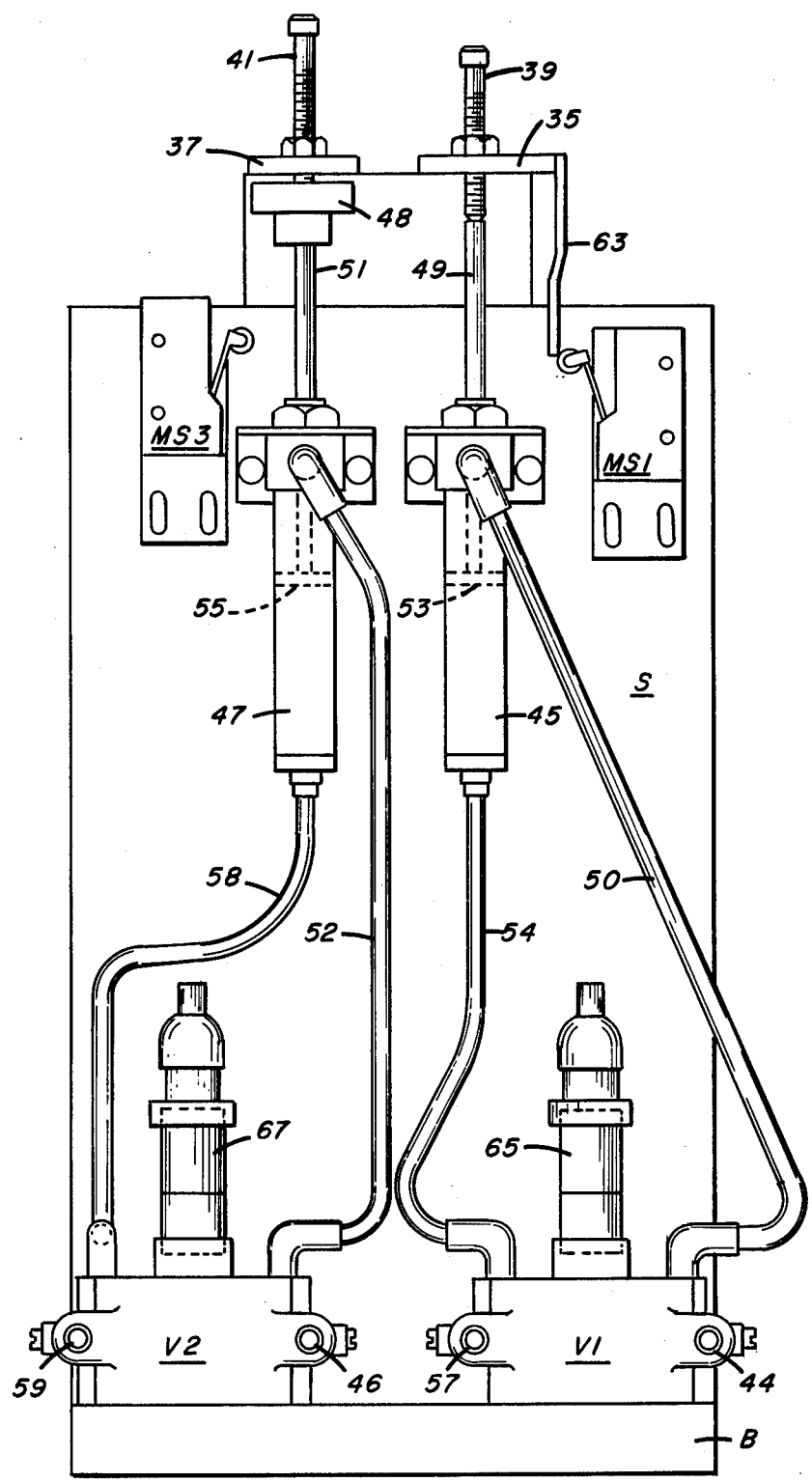
FIG. 3 is a rear elevational view of the apparatus as seen from the left in FIG. 2.
Figure 4:
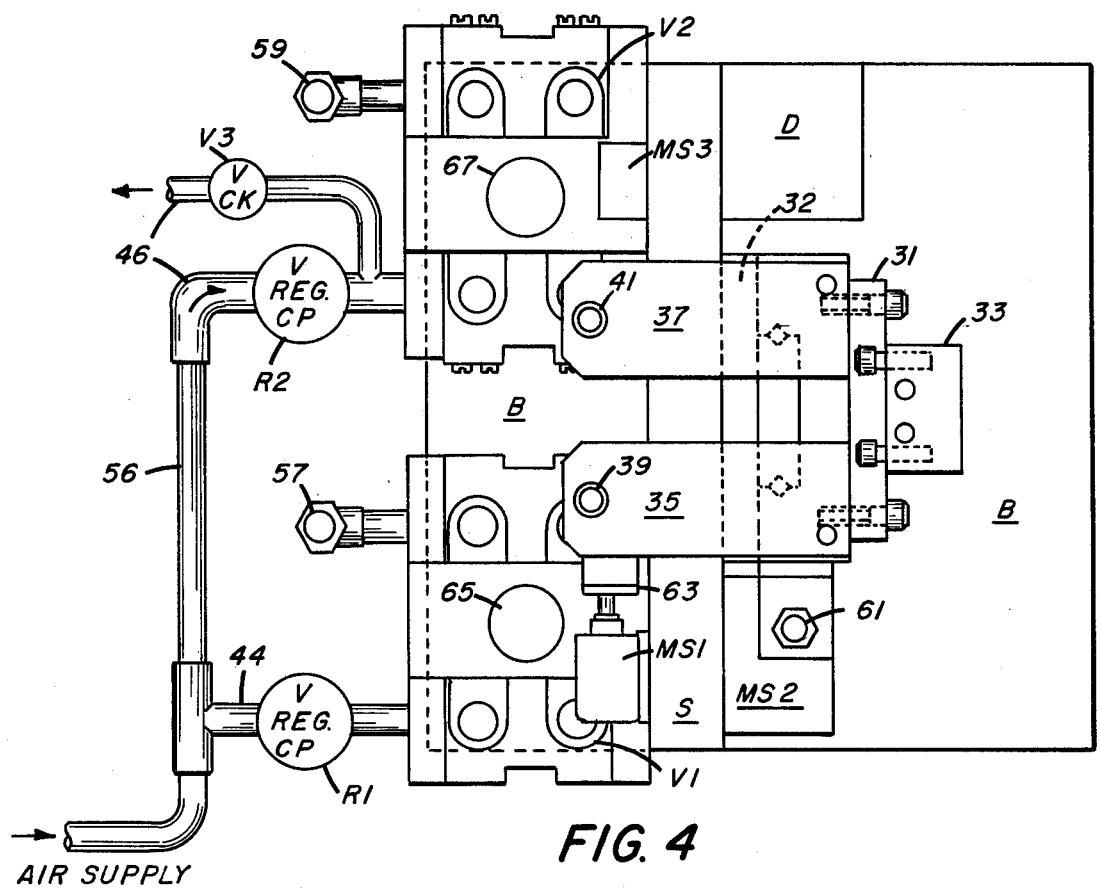
FIG. 4 is a plan view of the apparatus.
Figure 5:
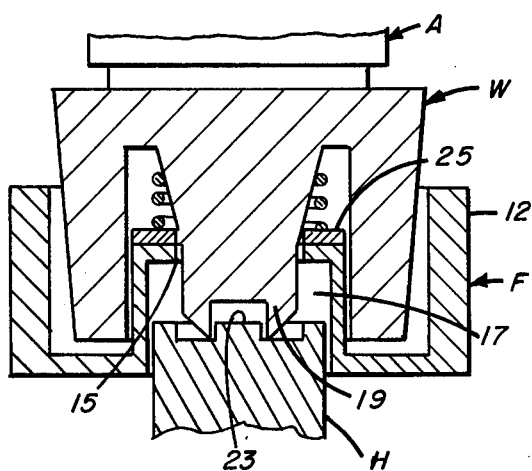
FIG. 5 is a vertical sectional view, on an enlarged scale, schematically showing a workpiece positioned in a fixture, with a stationary ultrasonic transducer and a movable anvil both positioned against the workpiece to rivet over a plastic center post of a sprocket mechanism.

As shown in FIGS. 2 and 5, fixture F comprises a cylindrical member 12 held by a bracket 13 and having a central aperture 15 and a downwardly facing recess 17. A workpiece W of thermoplastic material such as polystyrene, polyethylene, polypropylene or the like is placed in the top of the fixture with a center post or stud 19 projecting down through aperture 15. An example of such a workpiece is a motion picture film cartridge core assembly shown in U.S. Pat. No. 3,929,304, based on Ser. No. 540,296.

A stationary ultrasonic transducer U is held by a clamp C to a bracket 21 which projects horizontally from suppot S below and parallel to bracket 13. Transducer U includes a horn H which projects vertically up into recess 17 and has an appropriately shaped end 23 engaging center post 19 for riveting or peening over the end of the post so as to retain a spring-pressed pressure plate 25 on the post.

After workpiece W has been positioned as described above, a movable anvil A is brought down into contact with its top surface. Then transducer U is energized at 20–40 KHz more or less to commence melting or softening and peening over of center post 19. The weight of anvil A and its carriage 31 causes the anvil to move downwardly slightly as the end portion of center post 19 is peened over and spreads radially outwardly to form a flange for capturing pressure plate 25. The transducer U is then de-energized and anvil A is retained in position until the plastic has cooled, whereupon anvil A is withdrawn upwardly and the workpiece W is removed from the fixture F.

The mechanism for moving anvil A up and down includes a carriage 31 which is mounted on the front of support S for sliding movement, and includes a bracket 33 to which the anvil is bolted. Carriage 31 is slidably captured by a stationary mounting plate 32 bolted to and forming a part of support S, such as a Schneeberger Slide No. 6100.

Carriage 31 includes two laterally spaced horizontal parallel outriggers or fingers 35 and 37 which are bolted in place and project across the top of support S to its rear side. Fingers 35 and 37 carry adjacent their rear ends vertical set screws or abutments 39 and 41 which are threaded into the fingers for adjustment up and down to assist setting up and adjusting the apparatus for workpieces of various sizes.

Two laterally spaced vertical fluid pressure cylinders 45 and 47 are bolted to the rear side of support S and have piston rods 49 and 51 projecting upwardly into contact with (but not connected to) the lower ends of set screws 39 and 41 for holding anvil A in the up position when air or other pressure fluid is applied below pistons 53 and 55 through supply lines 44, 54 and 46, 58. Piston rod 51 includes a radial flange 48. Normally the pressure in cylinder 45 exerts a force on piston rod 49 which is slightly greater than the gravity force pulling the anvil A and carriage 31 down so as to hold the anvil A in an up positon. The pressure in cylinder 47 exerts a force on piston rod 51 which is slightly less than the force of gravity on A and 31. For example, assuming the weight of carriage 31 and anvil A together is 6 pounds, the air pressure below piston 53 should exert an upward force of 8 pounds, and that below piston 55 should exert an upward force of 4.5 pounds. Appropriate pressures are maintained by regulators R1, R2 which reduce the air pressure from the high pressure in a supply line 56 to the lower pressure required in the cylinders (see FIG. 4).

When anvil A is to be moved down into contact with a workpiece W, a 4-way valve V1 is actuated to connect cylinder 45 above piston 53 to compressed air line 50 so as to supply pressure fluid above piston 53. The piston 53 then develops a downward acceleration far greater than that produced by carriage 31 and anvil A and piston 55 acting alone, so that the end of piston rod 49 separates from set screw 39. Pressure fluid below piston 53 exhausts through a port 57. The weight of the carriage and anvil is enough greater than the upward force exerted by piston rod 51 that the anvil drifts slowly downward until it comes into contact with the top of workpiece W. Pressure fluid below piston 55 is compressed and bleeds slowly off through a check valve V3 which opens in line 46. When anvil A makes contact with workpiece W, a second 4-way valve V2 is actuated to admit pressure fluid to cylinder 47 above piston 55, and to connect cylinder 47 below piston 55 to exhaust line 58 and port 59. Once V2 is operated, separation of piston rod 51 from set screw 41 occurs and the full weight of carriage and anvil then rests on the workpiece W. Power to transducer U is then triggered by actuating a switch, and the center post 19 is riveted or peened over as described above. Upon completion of the operation, anvil A is raised to its original position by actuating valves V1 and V2 to reintroduce pressure fluid below pistons 53 and 55.

Figure 6:
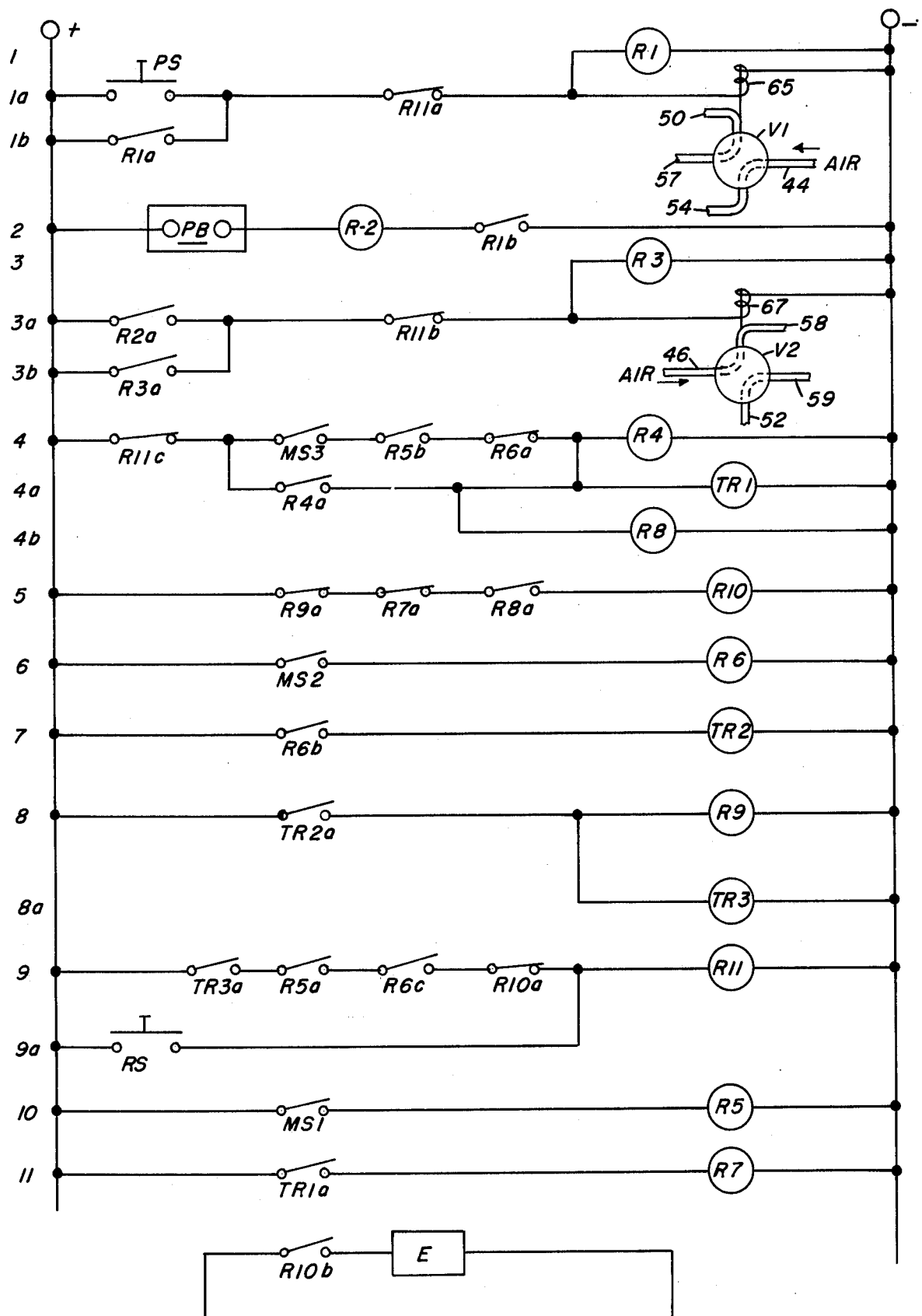
FIG. 6 is an electrical diagram of the automatic control system.

The foregoing functions can be performed manually by an operator who actuates the appropriate valves and switch. However, automatic operation is preferred. An automatic electrical control system shown schematically at D on FIGS. 1 and 4 assures the correct sequence of steps. It includes certain interlocks and safety features which will be described below with reference to FIG. 6. Line numbers applied to FIG. 6 will help to locate elements of the system.

Assuming that 110 volt alternating current power is connected to the circuit, that a workpiece W has been placed on fixture F, and that anvil A is in the up position, the operator first closes a pedal switch PS (line 1a) to energize relay R1 (line 1) which closes switches R1a (line 1b) and R1b (line 2). The 4-way valve V1 (line 1b) controlling compressed air to cylinder 45 is then actuated by a solenoid 65 to admit air through conduit 50 to the top of the cylinder. Air exhausts from below piston 53 through conduit 54 and regulator R1 so that piston 53 moves downwardly rapidly and the end of piston rod 49 separates from set screw 39.

Weight of anvil A and carrier 31 then causes piston 55 in cylinder 47 to move down slowly, thus exhausting air slowly through regulator R2, acting like a "counterweight".

If there is no workpiece in position, microswitches MS1 (line 10) and MS2 (line 6) will sense its absence and be closed by contact with cam finger 63 and adjustable set screw 61 on carrier 31 when the anvil reaches the bottom of its full stroke. Closing microswitch MS1 energizes relay R5 which closes switch R5a (line 9) and R5b (line 4). Closing microswitch MS2 energizes relay R6 (line 6) which opens switch R6a (line 4), and closes switch R6c (line 9) and R6b (line 7) energizing timer TR2 which in turn energizes times TR3 (line 8a) through closed switch TR2a (line 8). Once TR3 times out relay R11 (line 9) is energized through now closed switch TR3a, opening switches R11a (line 1a) and R11b (line 2a) to reset the circuit and cause pistons 53 and 55 to restore carrier 31 up to its original ready position by de-energizing solenoids 65, 67, thus actuating valves V1 and V2 to admit pressure fluid below the pistons.

If there is a workpiece W in position, when anvil A reaches the bottom of its stroke and is in contact with the workpiece, microswitch MS1 (line 10) is closed by cam finger 63, relay R5 is energized and its switches R5a (line 9) and R5b (line 4) are closed. The operator momentarily closes two manual switch buttons on a switch box $_{PB}$ (line 2) simultaneously, energizing relay R2 through now closed switch R1b. Relay R2 closes switch R2a (line 3a) momentarily, energizing relay R3 (line 3) which closes switch R3a (line 3b) thus energizing solenoid 67 and actuating valve V2 to admit air into the top of cylinder 47 and connect the bottom to exhaust through lines 58 and 59 to move its piston 55 down rapidly so as to part from set screw 41. Microswitch MS3 (line 4) is then closed by flange 48 on the top of piston rod 51 to energize relay R4 which closes switch R4a (line 4a). This energizes both relay R8 (line 4b) and master timer TR1 (line 4a).

Relay R8 (line4b) closes switch R8a (line 5) to energize transducer control relay R10 (line 5) which opens switch R10a (line 9) and also closes switch R10b (line 12) to energize transducer U through a conventional circuit, shown schematically by box E, to act on the workpiece as the horn H vibrates, e.g. at ultrasonic frequency of 20-40 KHz. Such circuits for energizing sonic transducers are well known.

If the anvil is not down and switch R5b (line 4) is open (because microswitch MS1 has not closed), then switch R4a cannot be closed because relay R4 cannot be energized, timer TR1 and relay R8 cannot be energized, and transducer control relay R10 cannot be energized.

During normal operation the workpiece will soften or melt and the anvil will move down slightly, e.g., 30 mils. At about the halfway point of its downward movement, microswitch MS2 (line 6) is closed by set screw 61 to energize relay R6 (line 6), closing switch R6b (line 7) and activating timer TR2 (line 7). When timer TR2 times out it closes switch TR2a (line 8) to energize relay R9 (line 8) along with a timer TR3 (line 8a). Relay R9 opens switch R9a (line 5) de-energizing the transducer control relay R10 to reopen switch R10b and de-energize transducer U. This feature of our apparatus is important because it assures that melting has actually begun before timer TR2 is energized and gives consistent results with all workpieces. If timing is started before melting starts, inconsistent results may be obtained because of variations of polystyrene or other plastic composition, because of slight variations in part size and shape, and because of slight variations in mating of the part with the horn H.

If the workpiece has not peened over, after timer TR1 (line 4a) times out switch TR1a (line 11) closes to energize relay R7 which opens switch R7a (line 5) and de-energizes the transducer control relay R10 and the transducer. Thus, master timer TR1, acting through relay R7 and switch R7a, acts as a safety measure. Then the operator closes reset switch RS to restore transducer U to its ready position.

After de-energizing the transducer, it is desirable to maintain contact of the anvil A with the workpiece W until the plastic has cooled down. Timing relay TR3 (line 8a) assures such a dwell. When TR3 times out after the dwell period, it closes switch TR3a (line 9), energizing relay R11 which opens switches R11a (line 1a), R11b (line 3a) and R11c (line 4) and causes all latch switches R1a (line 1b), R3a (line 3b), and R4a (line 4a) to reopen.

All timing relays TR1, TR2 and TR3 described above activate their corresponding switches when they time out, thus being of the "delay on" type.

Valves V1 and V2 then are both actuated to introduce compressed air through conduits 54, 58 and cause the pistons to rise in their cylinders while the tops of the cylinders are connected to exhaust conduits 57, 59, raising the carriage 31 and anvil A to their original position. Microswitches MS1, MS2 and MS3 reopen, causing switches R5 a and b, and R6 a and b, to reopen and de-energizing relay R11 (line 9). The system is then ready for the next cycle of operation.

In the foregoing, description valves V1 and V2 are shown schematically for simplicity. In practice they and solenoids 65 and 67 are embodied in a standard module control for double acting cylinder 4 way solenoid valves No. V935 DET 2100 of Skinner Manufacturing Co.

The principles of the invention can be practiced successfully with the positions of the anvil and transducer reversed so that the anvil is stationary and the transducer moves up and down above the anvil and fixture.

The invention has been described in detail with particular reference to preferred embodiments thereof, but it will be understood that variations and modifications can be effected within the spirit and scope of the invention.

We claim:

1. Apparatus for applying ultrasonic vibrations to a workpiece, said apparatus comprising:
   an ultrasonic transducer including a horn engageable with the workpiece for transmitting ultrasonic vibrations to the workpiece;
   an anvil vertically aligned with said horn for supporting the workpiece against the vibrations transmitted by said horn;
   a fixture including means for releasably holding the workpiece between said anvil and said horn;
   vertically moveable means including one of said transducer and said anvil for engaging the workpiece between said transducer and said anvil to apply pressure on the workpiece;
   mean for releasably holding said vertically moveable means spaced above said fixture in a ready position;
   means for releasing said vertically moveable means from the ready position to fall solely by the force of gravity toward said fixture; and
   dampening means coacting with said vertically moveable means for retarding the fall of said vertically moveable means to an acceleration less than gravity;
   whereby the pressure exerted on the workpiece between said transducer and said anvil is due solely to the weight of said vertically moveable means, but the impact of said vertically moveable means upon engagement with the workpiece is less than would be due to the free falling weight of said vertically moveable means.

2. Apparatus in accordance with claim 1 wherein said holding means comprises a piston rod, a piston on said piston rod, and a fluid cylinder for receiving said piston; said piston rod removeably contacting said vertically moveable means for holding said vertically moveable mean in said ready position; and wherein said releasing means comprises a first valve means for controlling the fluid pressure in said cylinder, for removing said piston rod from contact with said vertically moveable means, and for releasing said vertically moveable means to fall under the force of gravity.

3. Apparatus in accordance with claim 1 wherein said dampening means comprises a piston rod, a piston on said piston rod, a fluid cylinder for receiving said piston, and valve means for controlling the fluid pressure in said cylinder for retarding movement of said piston in said cylinder .

4. Apparatus in accordance with claim 1 wherein said holding means comprises a first piston rod, a first piston on said piston rod and a first fluid cylinder for receiving said piston; said first piston rod removeably contacting said moveable means for holding said moveable means in said ready position; wherein said releasing means comprises first valve means for removing said first piston rod from contact with said moveable means to release said moveable means to descend under the influence of gravity; and wherein said dampening means comprises a second piston rod, a second piston on said piston rod, and a second fluid cylinder for receiving said piston, said second piston contacting said moveable means from beneath said moveable means, and second valve means for retarding said second piston to move downwardly in said second cylinder at a velocity less than the free fall gravitational velocity of said moveable means while said second piston rod is in contact with said moveable means.

5. Apparatus in accordance with claim 4, wherein said first valve means comprises a first four-way valve selectively conrolling the admission and exhaust of fluid to and from said first cylinder above and below said first piston; said apparatus also comprising a second four-way valve selectively controlling the admission and exhaust of pressure fluid to and from said second cylinder above and below said second piston.

6. Apparatus in accordance with claim 5 wherein said transducer is stationary, and said anvil is said moveable means.

7. Apparatus in accordance with claim 5 wherein said anvil is stationary, and said transducer is said moveable means.

8. Apparatus in accordance with claim 1 including an automatic control system comprising sensing means for sensing the presence or absence of a workpiece in said fixture when said vertically moveable means falls, and reset means responsive to said sensing means when a workpiece is absent for restoring said vertically moveable means to its original ready position.

* * * * *